(12) United States Patent
Yoshii

(10) Patent No.: US 7,301,302 B2
(45) Date of Patent: Nov. 27, 2007

(54) SUPPLY OF ELECTRIC POWER USING FUEL CELL AND CHARGEABLE/DISCHARGEABLE STORAGE

(75) Inventor: Kinya Yoshii, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 195 days.

(21) Appl. No.: 10/275,941

(22) PCT Filed: Apr. 19, 2001

(86) PCT No.: PCT/JP01/03374

§ 371 (c)(1),
(2), (4) Date: Nov. 14, 2002

(87) PCT Pub. No.: WO01/89015

PCT Pub. Date: Nov. 22, 2001

(65) Prior Publication Data

US 2003/0106726 A1   Jun. 12, 2003

(30) Foreign Application Priority Data

May 15, 2000   (JP)   ............................. 2000-141822

(51) Int. Cl.
*H02J 7/00*   (2006.01)

(52) U.S. Cl. ................... 320/104; 180/65.1; 180/65.2; 180/65.3; 701/22; 701/54; 429/12

(58) Field of Classification Search ...... 180/65.1–65.3; 701/22, 54; 429/12; 320/104
See application file for complete search history.

(56) References Cited

U.S. PATENT DOCUMENTS

| | | | |
|---|---|---|---|
| 4,839,246 A | 6/1989 | Takabayashi | |
| 5,334,463 A | 8/1994 | Tajima et al. | |
| 5,558,596 A * | 9/1996 | Adachi et al. | ................. 701/57 |
| 5,631,532 A | 5/1997 | Azuma et al. | |
| 5,780,981 A | 7/1998 | Sonntag et al. | |
| 5,877,600 A | 3/1999 | Sonntag | |
| 5,991,670 A | 11/1999 | Mufford et al. | |
| 6,249,723 B1 * | 6/2001 | Lutz | ............................. 701/22 |
| 6,446,430 B1 * | 9/2002 | Roth et al. | ..................... 60/286 |
| 6,577,334 B1 * | 6/2003 | Kawai et al. | ................ 348/148 |

FOREIGN PATENT DOCUMENTS

| | | |
|---|---|---|
| EP | 0769402 A | 4/1997 |
| EP | 1055545 A | 11/2000 |

(Continued)

*Primary Examiner*—Bao Q. Vu
*Assistant Examiner*—Samuel Berhanu
(74) *Attorney, Agent, or Firm*—Oblon, Spivak, McClelland, Maier & Neustadt, P.C.

(57) ABSTRACT

Intended to utilize a fuel cell efficiently while ensuring good output responsiveness by the fuel cell.

In a vehicle having a motor as the drive power source, a fuel cell and battery are on board as the power source for the motor. A target output value for the fuel cell is set within a range such that fuel cell output can track change in power demand. The battery is charged/discharged so as to compensate for delay in fuel cell output relative to power demand. By setting a higher target output value the lower the remaining charge in the battery, the fuel cell can be utilized efficiently while ensuring good output responsiveness.

6 Claims, 15 Drawing Sheets

FOREIGN PATENT DOCUMENTS

| | | |
|---|---|---|
| EP | 1091437 A1 * | 4/2001 |
| JP | 63-289773 | 11/1988 |
| JP | 3-276573 | 12/1991 |
| JP | 5-182675 | 7/1993 |
| JP | 9-98512 | 4/1997 |
| JP | 9-306531 | 11/1997 |
| JP | 10-271706 | 10/1998 |
| JP | 10-326625 | 12/1998 |
| JP | 2000-12059 | 1/2000 |
| WO | 99/67846 | 12/1999 |

* cited by examiner

SUPPLY OF ELECTRIC POWER USING FUEL CELL AND CHARGEABLE/DISCHARGEABLE STORAGE

TECHNICAL FIELD

The present invention relates to supplying power by means of a fuel cell and rechargeable storage portion.

BACKGROUND ART

In consideration of the global environment, there have been proposed in recent years electric vehicles and hybrid vehicles driven by a motor that is powered by a fuel cell. Fuel cells are devices that generate electricity through an electrochemical reaction of hydrogen and oxygen. Fuel cell emissions are composed principally of water vapor, making hybrid vehicles and electric vehicles that use fuel cells very environmentally friendly.

However, fuel cells are typically characterized by low output responsiveness with respect to power demand. That is, when the accelerator is suddenly depressed, in some instances power may not be supplied rapidly in response. This is due to low responsiveness in the supply of fuel gas.

By continuously supplying a large quantity of fuel gas to the fuel cell regardless of power demand, output responsiveness can be improved, but since driving a pump etc. in order to supply fuel gas consumes energy, energy efficiency is lost.

Previously there was also proposed a method of using a fuel cell and battery in conjunction, using power from the battery to compensate for the delayed responsiveness of the fuel cell. For example, a fuel cell and battery are used as the power supply, and where a fluctuation in power demand is small enough to be met by the fuel cell, power is output by the fuel cell alone, whereas if there is a large fluctuation in power demand, power is provided by the fuel cell and battery together. The battery is charged by the fuel cell as needed.

Fuel cells are devices that are currently in development. Thus, there has not been sufficient study regarding the possibility of improving responsiveness through control thereof. Nor has there been sufficient study regarding methods of supplying power from a fuel cell and a rechargeable power source, such as a battery, used in conjunction, through optimal combination of the advantageous features of the two.

DISCLOSURE OF THE INVENTION

It is an object of the present invention to provide a technology that ensures good fuel cell output responsiveness to power demand, and that effectively utilizes same as a power source.

To solve the aforementioned problem at least in part, the invention employs the following arrangements.

A first power supply device of the invention resides in a power supply device that supplies power using a fuel cell and rechargeable storage portion as the power source, the device comprising:

a power demand input portion for progressively inputting the power demand placed on said power supply portion;

a memory portion that holds in memory a relationship of said power demand to a target output value for output by said fuel cell, the relationship defined by a range such that the slope of change of said target output value relative to change in power demand does not exceed a certain predetermined value determined on the basis of output responsiveness of said fuel cell;

a target output value setting portion that refers to said memory portion to set said target output value with reference to said power demand;

a fuel cell control portion for controlling operation of said fuel cell with reference to said target output value; and a charge/discharge portion for charging/discharging said storage portion on the basis of said power demand and said target output value.

According to the present invention, a target output value for the fuel cell is set within a range not to exceed a certain predetermined value determined on the basis of output responsiveness of the fuel cell, in other words, a range within which fuel cell output can track the change in power demand. Accordingly, the fuel cell is able to track the target output value and to output power in a stable manner. As a result, fuel cell output can be controlled smoothly, and excessive charge/discharge of the storage portion can be minimized.

Where a target output value falls outside the range that can be tracked by the fuel cell, fuel cell operation is allowed to take its own course, and is substantially impossible to control. According to the present invention, the range of target output value settings is limited so that control of the fuel cell can be maintained. Accordingly, the capabilities of the fuel cell can be fully utilized. As a result, excessive charge or discharge of the storage portion can be minimized while at the same time outputting power in a highly responsive manner.

Power demand can be input via various parameters. For example, where the invention is implemented in a vehicle, degree of acceleration can be used as such a parameter.

In the power supply device of the invention, the charge/discharge portion will preferably perform control to compensate for difference between said power demand and power suppliable by said fuel cell.

A secondary cell or capacitor, for example, may be employed as the storage portion. Compensation herein refers at a minimum to discharge by the storage portion in order to supplement fuel cell output where this is insufficient to meet power demand. Where fuel cell output exceeds power demand, the excess power will preferably be used for charging.

In the aforementioned power supply device, said relationship can be set such that in a first predetermined zone wherein said power demand is low, said target output value is greater that said power demand. In a second predetermined zone wherein said power demand is high, said target output value can be set lower than said power demand.

With these settings, average operating efficiency of the fuel cell can be improved.

Fuel cell generation efficiency varies with power demand. Where power demand is relatively low, operating efficiency is often high, and where high, operating efficiency is often low. By setting target output values on the basis of the aforementioned relationship, excess power output by the fuel cell when power demand is low can be used for charging the storage portion. When power demand is high, power from the fuel cell can be reduced, with the power deficit being compensated for through output from the storage portion. By so doing the fuel cell can operate in the high efficiency range, improving the energy efficiency of the power supply device.

The first and second zones may be set appropriately with reference to factors such as generation efficiency of the fuel cell, discharge efficiency of the storage portion, standard average power demand throughout the operation period etc. If the first zone is excessively wide, the storage portion may not be sufficiently charged. If the second zone is excessively wide, the storage portion may not have sufficient power. In either instance the energy efficiency of the power supply device as whole will be depressed. When setting the first and second zones, charge/discharge by the storage portion can be made to cancel out by taking into consideration standard average values, so that energy efficiency is improved.

The power supply device of the invention will preferably further comprise a sensor portion for sensing remaining charge in said storage portion.

said relationship is set for each said remaining charge, and said target output value setting portion sets said target output value in consideration of said remaining charge.

For example, said relationship is preferably such that said target output value is larger the smaller said remaining charge.

By so doing, when the remaining charge of the fuel cell is low, it can be charged by the fuel cell. As charge of the storage portion can readily be maintained within a predetermined range, the storage portion can be made more compact and the power supply device can be made more compact.

A second power supply device of the invention resides in a power supply device that supplies power using a fuel cell and rechargeable storage portion as the power source, the device comprising:

a fuel cell control portion for controlling operation of said fuel cell with reference to a predetermined target output value;

a charge/discharge portion for charging/discharging said storage portion to compensate for difference between said power demand and power outputtable by said fuel cell;

a rate of change sensing portion for sensing the rate of change of said power demand; and a target output value setting portion for modifying said target output value with reference to said power demand when the absolute value of said rate of change exceeds a predetermined value.

The second power supply device corresponds to limiting of the timing for setting target output values. By avoiding frequent fluctuations in target output value, stable operation of the fuel cell can be realized.

Specifically, according to the invention the timing at which a new target output value is set is when the rate of change of power demand exceeds a predetermined value. Where the rate of change is small, the same target output value is maintained. By so doing, target output value setting for the fuel cell is made less sensitive to small fluctuations in power demand. As a result the fuel cell can be controlled in a stable manner. Discrepancies in output from the fuel cell resulting from small fluctuations in power demand can be compensated for by the storage portion. Accordingly, as with the first power supply device, output responsiveness to power demand can be ensured while effectively utilizing the fuel cell.

The second power supply device has the advantage of being able to improve energy efficiency of the device as a whole. Consider for the moment a case of fuel cell output controlled to a constant value, with discrepancies relative to power demand being compensated for by the storage portion. In this case, the larger the difference between fuel cell output and power demand, the more supplemental power must be provided by the storage portion. Where power is supplied under such conditions, storage portion charge/discharge is prone to becoming unbalanced. Further, since charging/discharging entails energy loss, loss of energy efficiency may result. With the second power supply device, target output value for the fuel cell is updated according to a predetermined timing so that fuel cell output can be maintained at a level close to power demand, and supplemental power provided by the storage portion reduced. As a result, the adverse effects described above may be avoided, and energy efficiency can be improved.

In the second power supply device as well it is preferable to correct said target output value with reference to change in remaining charge. By so doing, remaining charge in the storage portion can be maintained within a predetermined range relatively easily.

A third power supply device of the invention resides in a power supply device that supplies power using a fuel cell and rechargeable storage portion as the power source, the device comprising:

a power demand input portion for progressively inputting power demand;

a power demand estimating portion for estimating future power demand after a predetermined period of time;

a target output value setting portion for setting a target output value for output by said fuel cell at the current point in time, based on said future power demand, current power demand and output responsiveness of said fuel cell;

a fuel cell control portion for controlling operation of said fuel cell with reference to said target output value; and a charge/discharge portion for charging/discharging said storage portion so as to compensate for difference between said current power demand and power outputtable by said fuel cell.

The third power supply device changes the target output value for the fuel cell in advance based on estimation of the future, making it possible to improve responsiveness. Charge and discharge of the storage portion can be reduced as well.

Setting of target output values may be done, for example, by increasing target output value in advance with an increase in future power demand, or decreasing target output value in advance with a decrease in future power demand.

In the third power supply device as well it is preferable to correct said target output value with reference to change in remaining charge.

Estimating power may be performed, for example, on the basis of load information from a load information memory portion having pre-stored in memory load information that indicates future operating status of a load supplied with power by the power supply device.

Load information consists, for example, of information corresponding to a future driving plan. Where the power supply device of the invention will be installed in a vehicle, route information provided by a navigation system may be used as load information.

Route information includes information such as road grade on the route over which the vehicle will travel, etc. Where the invention is implemented in an automobile, using route information enables target output value for and output of the fuel cell to be increased in advance where, for example, there is an upgrade on the route to the destination, or where a freeway will be entered.

Alternatively, past history or other information of various kinds may be used to estimate power.

Besides the power supply device arrangement described above, the invention may be provided as a control method for a power supply device. In conjunction with a motor having the power supply device as its power source, the invention may be provided as a drive power output device. Alternatively the invention may be provided as an electric car or hybrid vehicle having this motor as its drive power source.

BEST MODE FOR CARRYING OUT THE INVENTION

Embodiment of the invention shall be described on the basis of an example of application to a hybrid vehicle.

Figure 1:
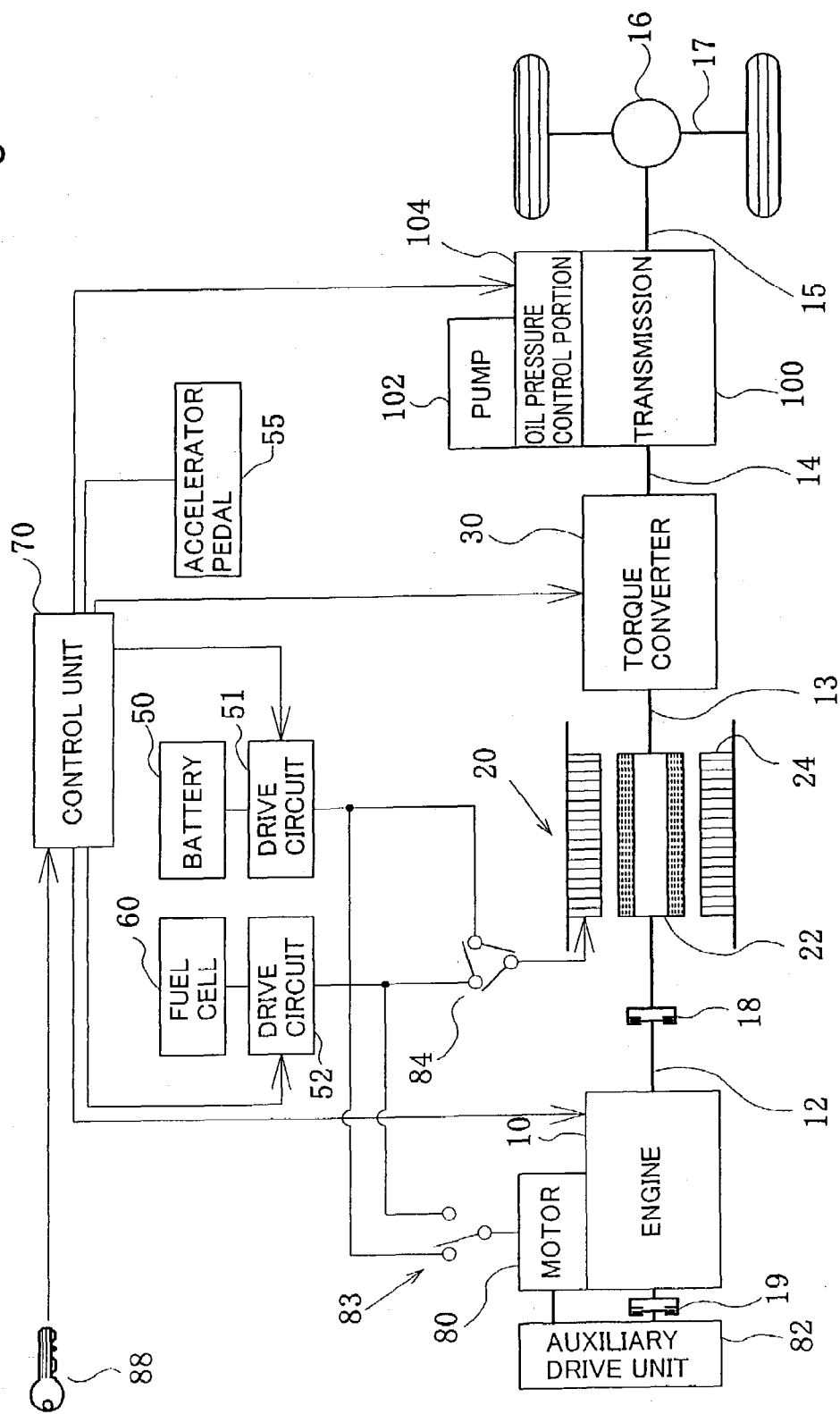
FIG. 1 is a simplified configuration diagram of the hybrid vehicle of Example 1.

(1) Arrangement of the Device:

FIG. 1 is a simplified configuration diagram of the hybrid vehicle of Example 1. The power source for the hybrid vehicle of this example is an engine 10 and motor 20. As shown in the drawing, the power system of the hybrid vehicle of this example has an arrangement in which engine 10, an input clutch 18, motor 20, a torque converter 30 and a transmission 100 are series-connected in that order from the upstream end. That, is the crankshaft 12 of engine 10 is coupled to motor 20 via input clutch 18. Transmission of power from engine 10 may be turned on and off through ON/OFF operation of input clutch 18. Rotary shaft 13 of motor 20 is coupled to torque converter 30 as well. Output shaft 14 of torque converter 30 is coupled to transmission 100. Output shaft 15 of transmission 100 is coupled to axle 17 via a differential gear 16. These elements are described in order hereinbelow.

Engine 10 is an ordinary gasoline engine. However, engine 10 has a mechanism whereby the opening/closing timing of the air intake valve that sucks the gasoline/air mixture into the cylinder and of the exhaust valve that expels combusted exhaust from the cylinder is adjustable relative to piston up and down motion (hereinafter this mechanism is termed VVT mechanism). VVT mechanism arrangements are well known and will not be described in detail here. Engine 10, by adjusting the opening/closing timing so that there is delayed shutting of each valve relative to piston up and down motion, can reduce so-called pumping loss. As a result, when motoring engine 10, the torque needing to be output from motor 20 can be reduced. During combustion of gasoline to output power, the VVT mechanism controls opening/closing of the valves under timing providing the best combustion efficiency for the rpm of the engine 10.

Motor 20 is a three-phase synchronous motor comprising a rotor 22 having a plurality of permanent magnets on its outer peripheral surface, and a stator 24 having wound thereon a three phase coil for setting up a rotating magnetic field. Motor 20 is rotary-driven by interaction of magnetic fields produced by the permanent magnets provided to rotor 22 and the magnetic field produced by the three phase coil of stator 24. When motor 20 is made to rotate by external force, interaction of these magnetic fields produces electromotive force at the two ends of the three phase coil. For motor 20 a sine wave magnetization motor in which magnetic flux density between rotor 22 and stator 24 has a sine wave distribution in the circumferential direction may be employed, but in this example a non-sine wave magnetization motor capable of outputting high torque is employed.

A battery 50 and fuel cell system 60 are provided as the power source for motor 20. However, the fuel cell system is the principal power source. Battery 50 is used as a power source to supply supplemental power to motor 20 in the event that fuel cell system 60 should malfunction, or under excessive operating conditions in which adequate power cannot be output. Power from battery 50 is supplied principally to the control unit 70 that controls the hybrid vehicle, and to electrical equipment such as illumination devices etc.

Between motor 20 and the power sources there is provided a changeover switch 84 for switching the connection state. Changeover switch 84 can switch connections among any of the three components, i.e., battery 50, fuel cell system 60 and motor 20. Stator 24 is electrically connected to battery 50 via changeover switch 84 and a drive circuit 51. It is connected to connected to fuel cell system 60 via changeover switch 84 and a drive circuit 52. Drive circuits 51, 52 are each configured as a transistor inverter; for each of the three phases of motor 20, there are provided a plurality of transistors in sets of two, on the source end and sink end. These drive circuits 51, 52 are electrically connected to control unit 70. When control unit 70 performs PWM control of ON/OFF times of the transistors of drive circuits 51, 52, pseudo three phase alternating current having battery 50 and fuel cell system 60 as the power source flows through the three phase coil of stator 24, setting up a rotating magnetic field. Through the action of the rotating magnetic field motor 20 functions as a motor or generator as described previously. Fuel cell system 60, battery 50, drive circuits 51, 52, control unit 70, and changeover switch 84 function as a power supply device. These components together with motor 20, engine 10 etc. function as a drive power output device.

Figure 2:
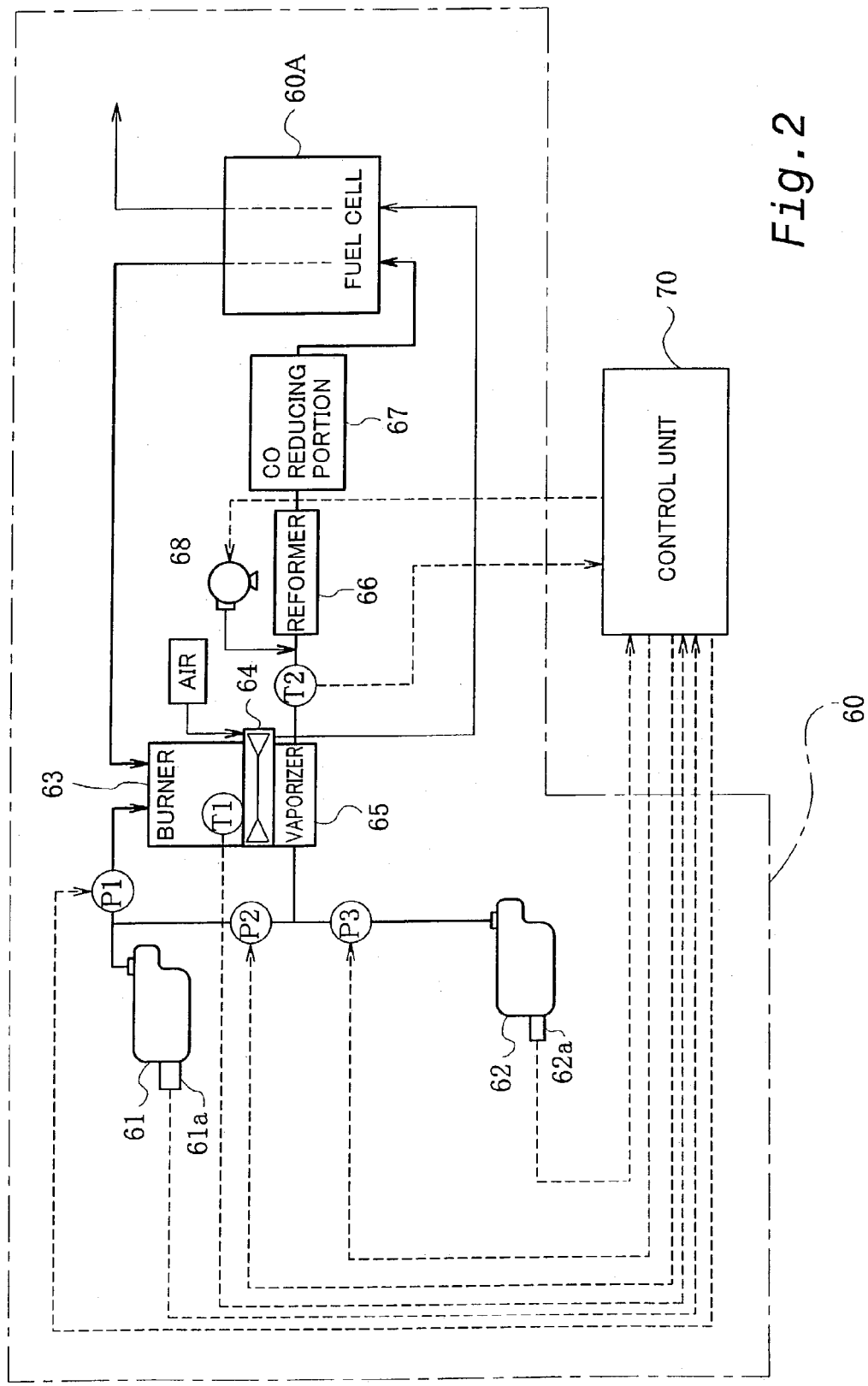
FIG. 2 is an explanatory diagram showing a simplified configuration of a fuel cell system.

FIG. 2 is an explanatory diagram showing a simplified configuration of a fuel cell system. Fuel cell system 60 has as its principal elements a methanol tank 61 for storing methanol and having a switch 61a, a water tank 62 for storing water and having a switch 62a, a burner 63 for generating combustion gas, a compressor 64 for compressing air, a vaporizer 65 provided with burner 63 and compressor 64, a reformer 66 for generating combustion gas by a reforming reaction, a CO reducing portion for reducing carbon monoxide (CO) concentration in the combustion gas, and a fuel cell 60A for producing electromotive force by an electrochemical reaction. Operation of these elements is controlled by control unit 70.

Fuel cell 60A is solid polymer electrolyte fuel cell composed of a stack of cells each of which is constructed of an electrolyte membrane, cathode, anode and separator. The electrolyte membrane consists, for example, of a proton conductive ion exchange membrane fabricated of solid polymer electrolyte material such as fluororesin. The anode and cathode are both fabricated of carbon cloth woven from carbon fiber. The separator is fabricated of gas impermeable conducting material such as dense carbon rendered gas impermeable by compacting the carbon. Channels for fuel gas and oxidant gas are formed between anode and cathode.

The elements of the fuel cell system 60 are connected as follows. Methanol tank 61 is connected to vaporizer 65 by a line. A pump P2 situated on the line adjusts flow rate while supplying methanol fuel to the vaporizer 65. Water tank 62 is similarly connected to vaporizer 65 by a line. A pump P3 situated on the line adjusts flow rate while supplying water to the vaporizer 65. The methanol line and water line merge into a single line downstream from pumps P2, P3, and connects to vaporizer 65.

Vaporizer 65 vaporizes the supplied methanol and water. Vaporizer 65 is provided with both burner 63 and compressor 64. Vaporizer 65 boils and vaporizes methanol and water by means of combustion gas supplied from burner 63. The fuel for burner 63 is methanol. Methanol tank 61 is connected by a line to burner 63 as well as to vaporizer 65. Methanol is supplied to burner 63 by a pump P1 situated on this line. Burner 63 is also supplied with leftover fuel waste gas not consumed in the electrochemical reaction in fuel cell 60A. Of methanol and fuel waste gas, burner 63 mainly burns the latter. Burner 63 combustion temperature is controlled on the basis of output of a sensor T1, and is maintained at about 800° C. to 1000° C. As combustion gas from burner 63 is conveyed to vaporizer 65 a turbine spins to drive compressor 64. Compressor 64 draws in air from outside the fuel cell system 60, compresses it, and supplies the compressed air to the anode side of fuel cell 60A.

Vaporizer 65 and reformer 66 are connected by a line. Source fuel gas from vaporizer 65, i.e. mixed gas of methanol and water vapor, is transported to reformer 66. Reformer 66 reforms the supplied source fuel gas consisting of methanol and water, to produce hydrogen-rich fuel gas. On the transport line leading from vaporizer 65 to reformer 66 there is provided a temperature sensor T2, and the amount of methanol supplied to burner 63 is controlled so that this temperature is at a constant level, typically about 250° C. Oxygen is involved in the reforming reaction in reformer 66. To provide the oxygen needed for the reforming reaction, reformer 66 is provided with a blower 68 for supplying outside air.

Reformer 66 and CO reducing portion 67 are connected by a line. Hydrogen-rich fuel gas from reformer 66 is supplied to CO reducing portion 67. In the reaction process in reformer 66 the combustion gas ordinarily contains a given amount of carbon monoxide (CO). CO reducing portion 67 reduces carbon monoxide concentration in the combustion gas. In a solid polymer electrolyte fuel cell carbon monoxide contained in combustion gas can hinder the anode reaction and depress fuel cell performance. CO reducing portion 67 oxidizes carbon monoxide present in the fuel gas to carbon dioxide, thereby reducing the concentration of carbon monoxide.

CO reducing portion 67 and the anode of fuel cell 60A are connected by a line. Fuel gas of reduced carbon monoxide concentration is supplied to the cell reaction on the cathode side of fuel cell 60A. As described previously, a line for feeding in compressed air is connected to the cathode side of fuel cell 60A. This air is supplied as oxidant gas to the cell reaction at the anode side of fuel cell 60A.

The fuel cell system 60 having the above arrangement can supply power by means of a chemical reaction using methanol and water. In this example, a fuel cell system 60 using methanol and water is provided, but the fuel cell system 60 is not limited to this, is being possible to employ instead various other arrangements such as those using gasoline/natural gas reforming, pure hydrogen etc. In the following description the entire fuel cell system 60 shall be referred to as fuel cell 60.

Torque converter 30 (FIG. 1) is a known art drive power transmission mechanism utilizing a fluid. The input shaft of torque converter 30, i.e. the output shaft 13 of motor 20, and the output shaft 14 of torque converter 30 are not mechanically coupled, but can rather rotate with relative slippage. Torque converter 30 is provided with a lockup clutch that locks the two together under predetermined conditions so as to prevent slippage of the two rotary shafts. ON/OFF of the lockup clutch is controlled by control unit 70.

Transmission 100 houses a plurality of gears, a clutch, one-way clutch, brake etc. and is a mechanism that by switching the change gear ratio converts the torque and rpm of the output shaft 14 of torque converter 30 transmitted to output shaft 15. In this example, there is employed a transmission capable of five forward speeds and one reverse speed. The gear of transmission 100 is set by control unit 70 depending on vehicle speed etc. using oil pressurized by a pump 102 and under the control of an oil pressure control portion 104. Alternatively the driver may manually operate a shift lever provided inside the vehicle to select shift position so as to enable gear shifting over a wide range.

An auxiliary drive unit 82 for driving auxiliary equipment is selectively driven by either the engine 10 via the clutch 19, or by the motor 80 via the switching of the switch 83.

Figure 3:
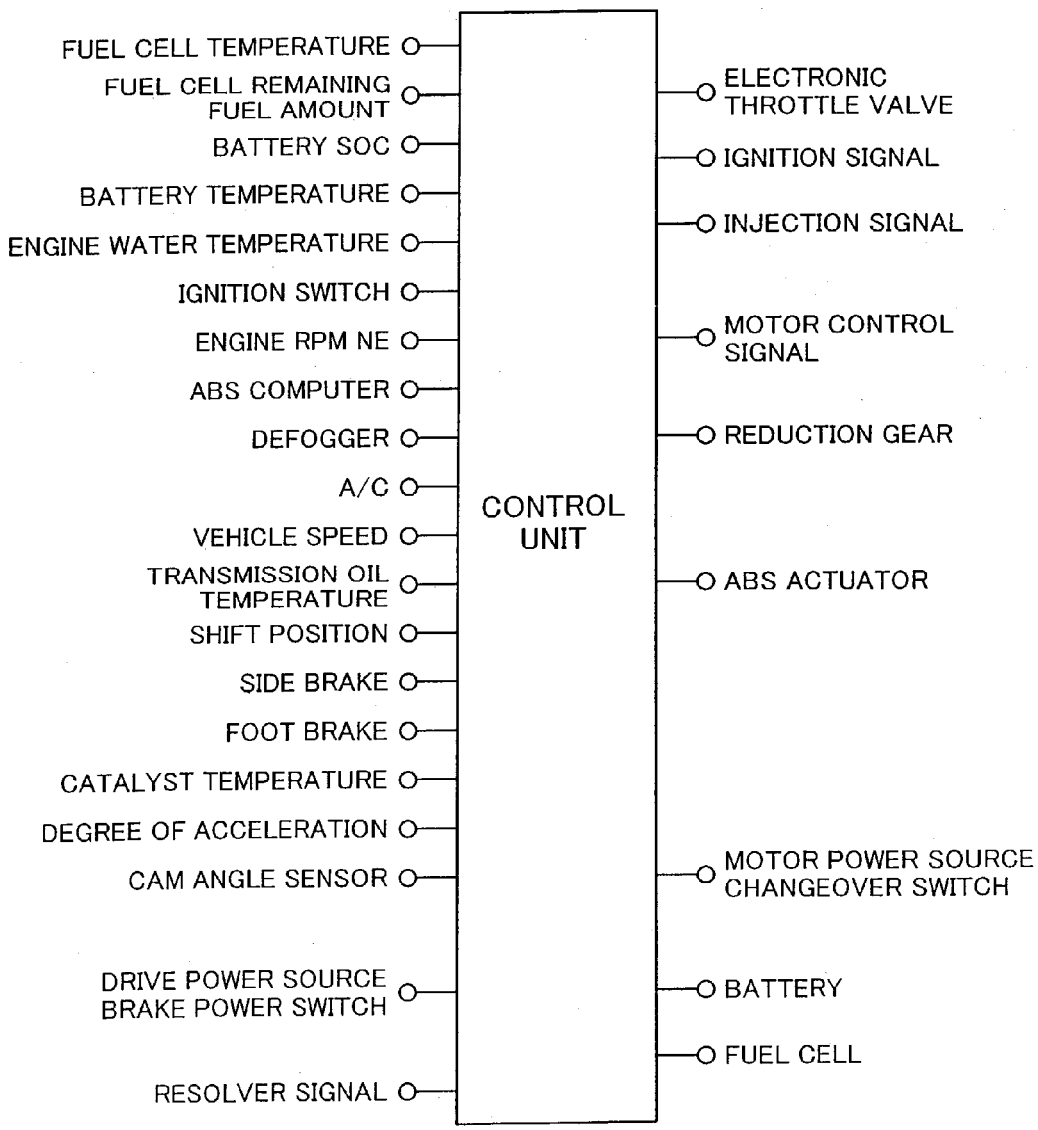
FIG. 3 is an explanatory diagram showing input/output signal connections to control unit 70.

In the hybrid vehicle of this example, operation of engine 10, motor 20, torque converter 30, transmission 100, auxiliary drive motor 80 etc. is controlled by control unit 70 (see FIG. 1). Control unit 70 is a one-chip microcomputer housing a CPU, RAM, ROM etc. wherein the CPU executes various control processes, described later, according to a program stored in ROM. Various input/output signals are connected to the control unit 70 to enable control to be realized. FIG. 3 is an explanatory diagram showing input/output signal connections to control unit 70. Signals input to control unit 70 are shown on the left side in the drawing, and signals output from control unit are shown on the right side.

Signals input to control unit 70 are signals from various switches and sensors. These signals include, for example, fuel cell temperature, fuel cell remaining fuel amount, battery remaining charge SOC, battery temperature, engine 10 water temperature, ignition switch, engine 10 rpm, ABS computer, defogger, air conditioning ON/OFF, vehicle speed, torque converter 30 oil temperature, shift position, side brake ON/OFF, foot brake depression, temperature of catalyst cleaning engine 10 exhaust, degree of degree of acceleration associated with depression of the accelerator pedal 55, cam angle sensor, drive power source brake power switch, and resolver signal. Control unit 70 inputs a large number of additional signals, but these are omitted in the drawing.

Signals output by control unit 70 are signals for controlling engine 10, motor 20, torque converter 30, transmission 100 etc. These signals include for example a signal for controlling an electronic throttle valve, an ignition signal for controlling the ignition period of engine 10, a fuel injection signal for controlling fuel injection, a motor control signal for controlling operation of motor 20, a reduction gear control signal, an ABS actuator control signal, a control signal for power source changeover switch 84 of motor 20, a battery 50 control signal, a fuel cell system 60 control signal etc. Control unit 70 outputs a large number of additional signals, but these are omitted in the drawing.

(2) Typical Operation:

Following is a description of typical operation of the hybrid vehicle of this example. The hybrid vehicle of this example has engine 10 and motor 20 as its drive power source. Control unit 70 drives the vehicle using these two selectively with reference to driving conditions, i.e. vehicle speed and torque. Selective use of the two is pre-established as a map stored in ROM in control unit 70.

Figure 4:
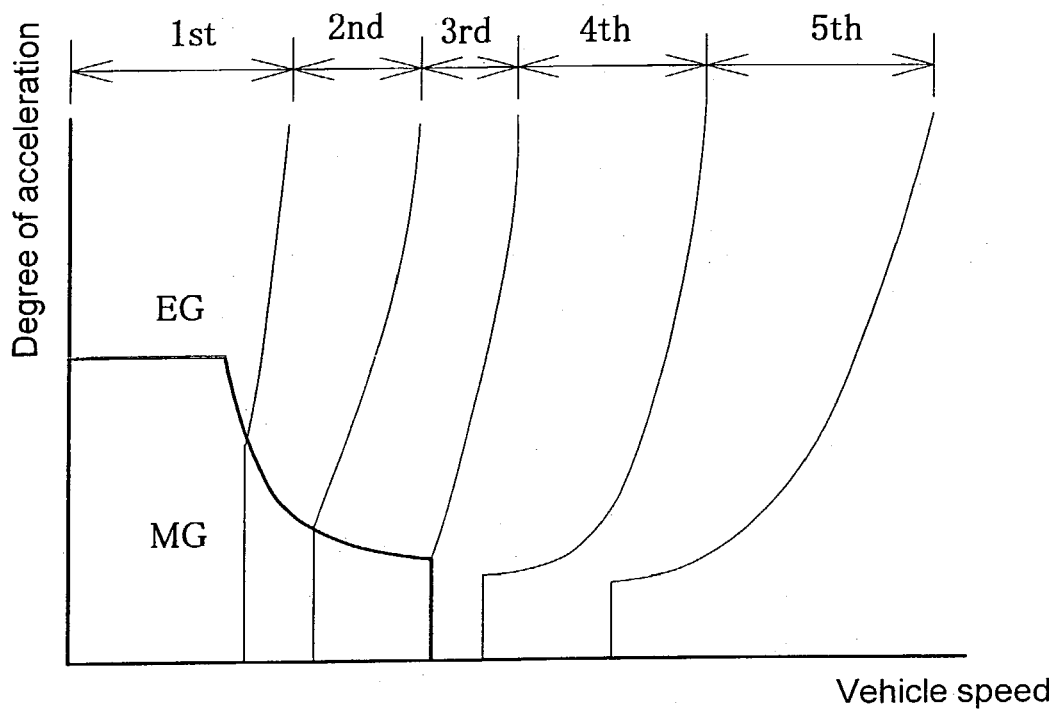
FIG. 4 is an explanatory diagram showing relationships of vehicle driving conditions and drive power source.

FIG. 4 is an explanatory diagram showing relationships of vehicle driving conditions and drive power source. Zone MG in the diagram is the zone of driving using motor 20 as the drive power source. The zone outside zone MG is the zone of driving using engine 10 as the drive power source (zone EG). Hereinbelow the former shall be termed EV driving and the latter as engine driving. With the arrangement shown in FIG. 1 it is possible to drive using both engine 10 and motor 20 as drive power sources, but this driving zone is not provided in the present example.

As shown in the drawing, the hybrid vehicle of this example, when starting to drive with the ignition switch 88 on, initially accelerates in EV driving. In this zone input clutch 18 is off during driving. At the point in time at which the vehicle accelerating by EV driving reaches a driving condition close to the boundary of zone MG and zone EG in the map of FIG. 4, control unit 70 turns on input clutch 18 whereupon engine 10 is turned over by motor 20. Control 70 injects and ignites fuel under timing such that the rpm of engine 10 increases until reaching a predetermined value. After engine 10 has been started in this way, driving in zone EG uses only engine 10 as the drive power source. When driving in this zone begins, control unit 70 shuts down all transistors of drive circuits 51, 52. As a result, motor 20 simply idles.

Control unit 70 performs control to switch drive power source with reference to vehicle driving conditions in this manner, as well as performing a process of shifting gears in transmission 100. As with switching drive power source, gear shifting is done on the basis of a pre-established map for vehicle driving conditions. The map differs depending on shift position as well. In FIG. 4 there is shown a map corresponding to D position, 4 position, and 3 position. As shown by this map, control unit 70 executes gear shifting such that gear ratio becomes smaller as vehicle speed increases.

Figure 5:
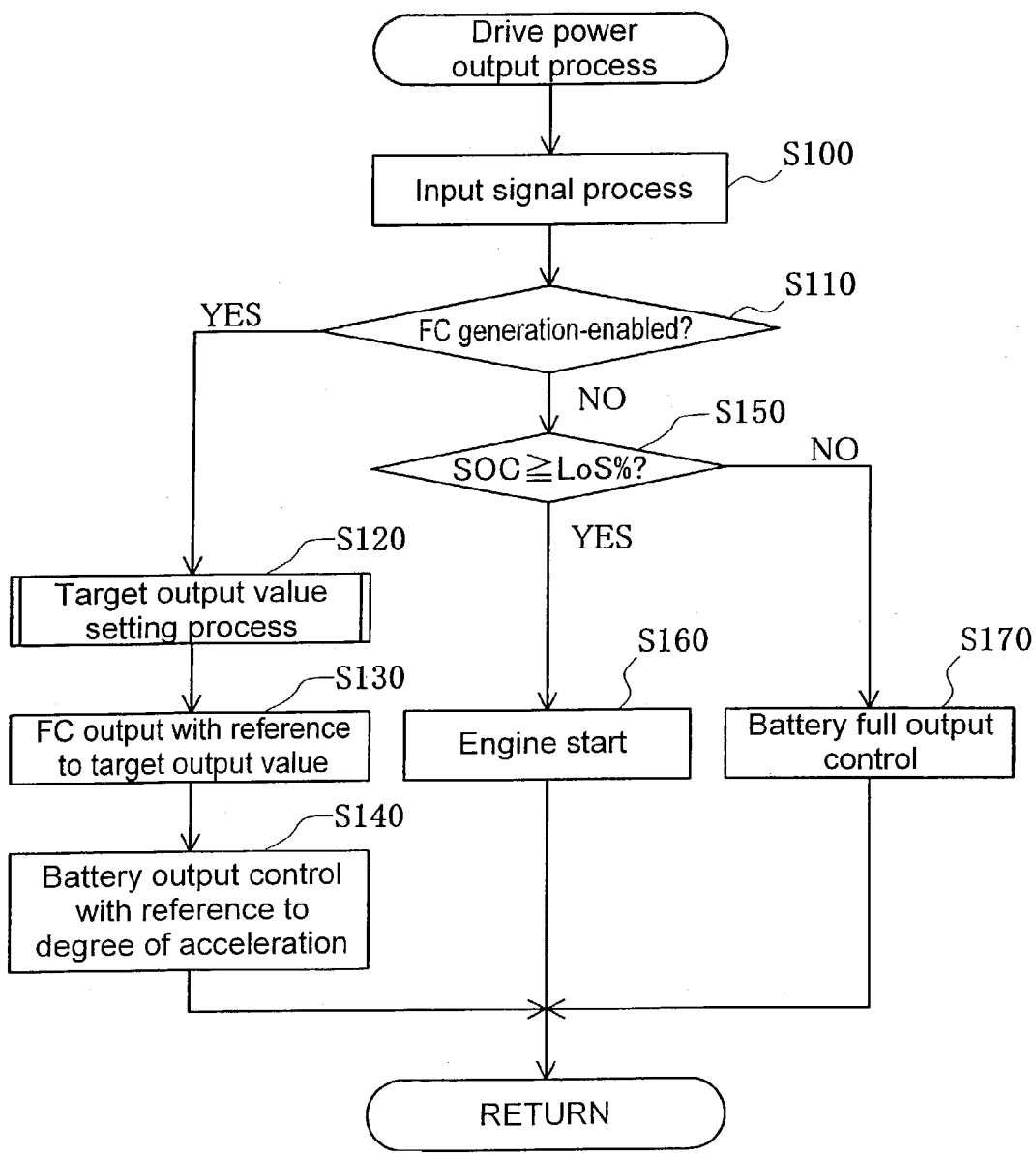
FIG. 5 is a flow chart of a power output process routine in zone MG.

(3) Drive Power Output Process:

The drive power output process in zone MG is described. FIG. 5 is a flow chart of a power output process routine in zone MG in Example 1. The process is executed when the vehicle is in the operating state, in other words, when ignition switch 88 is ON. When ignition switch 88 is OFF, operation of the entire vehicle is halted, so this process is not executed. When this process is started, the CPU inputs various sensor and switch signals (Step S100). Next, the CPU determines whether the fuel cell (FC: Fuel Cell) 60 is in a power generation-enabled state (Step S110).

Determining from fuel cell temperature, fuel cell remaining fuel amount etc. input to control unit 70 whether fuel cell 60 is in a power generation-enabled state, a setting process of a target output value for output by fuel cell 60 is performed (Step S120). In this process, of the signals input in Step S100, battery 50 remaining charge SOC and degree of degree of acceleration are used. Then, referring to a table stored in ROM, described later, a target output value for fuel cell 60 is set with reference to these. Here, degree of degree of acceleration is a parameter relating to power demand on the power supply device including fuel cell 60 and battery 50, and is determined by the amount of depression of the accelerator pedal 55.

Figure 6:
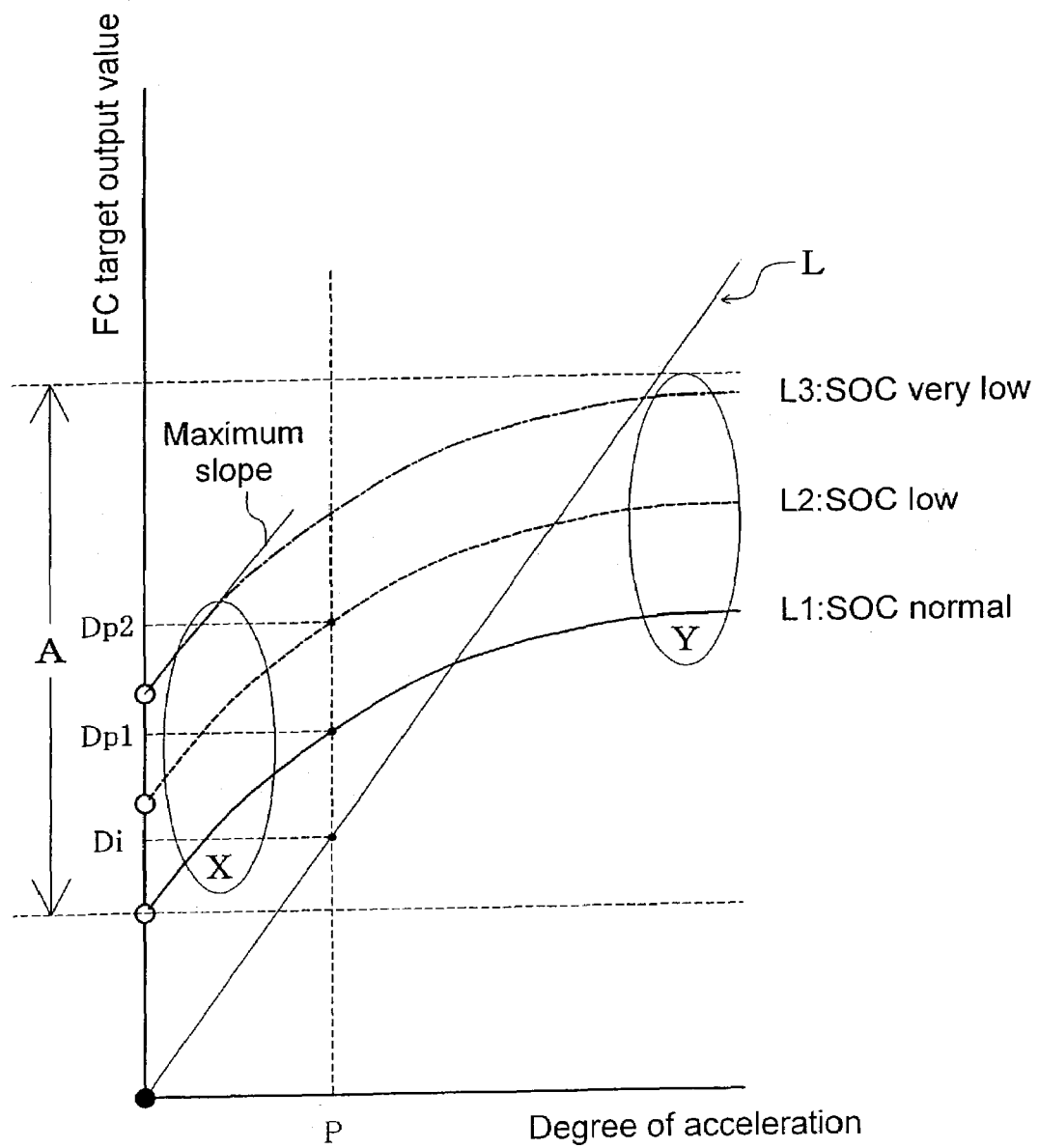
FIG. 6 is an explanatory diagram showing relationships of remaining charge SOC, degree of degree of acceleration and target output value.

FIG. 6 is an explanatory diagram showing relationships of remaining charge SOC of battery 50, degree of degree of acceleration, and target output value of fuel cell 60 in Example 1. Power load place on the power supply device, associated with degree of acceleration, is indicated by thin line L. In this example, the target output value of fuel cell 60 is determined with reference to remaining charge SOC of battery 50 and degree of degree of acceleration. Line L1 shown by the solid line, line L2 shown by the dashed line, and line L3 shown by the dotted-dashed line correspond to different levels of remaining charge SOC of battery 50, becoming lower in this order. These relationships are stored as a table in the ROM of control unit 70. In this example, target output value of fuel cell 60 relative to remaining charge SOC of battery 50 and degree of degree of acceleration is set to three levels, but may be set to more levels, or vary continuously.

In this example, as shown in FIG. 6, the slope of the amount of change in target output value relative to the amount of change in degree of degree of acceleration is set so as to not exceed a predetermined maximum slope. This maximum value is a value enabling output of fuel cell 60 to track target output value, even where degree of degree of acceleration changes suddenly.

In the zone of relatively low degree of degree of acceleration (zone X in the drawing), target output value is set higher than power demand, and in the zone of relatively high degree of degree of acceleration (zone Y in the drawing) target output value is set lower than power demand. That is, output of fuel cell 60 is limited to within zone A shown in the drawing. The fuel cell 60 of this example has high generation efficiency in zone A shown in the drawing. Therefore, by setting target output value in this way, fuel cell 60 may be utilized efficiently.

For example, if remaining charge SOC of battery 50 is normal (line L1), input of a relatively small value P for degree of degree of acceleration will result in setting of a target value Dp1 that is higher than the power demand Di. By so doing power in excess of the power demand is output from fuel cell 60. The excess power output from fuel cell 60 charges the battery 50.

Alternatively, if remaining charge SOC of battery 50 is low (line L2), input of value P for degree of acceleration will result in setting of a target value Dp2 that is higher than the target value Dp1 when the remaining charge SOC of battery 50 is normal. By so doing more power than normal is output from fuel cell 60. The excess power output from fuel cell 60 charges the battery 50 whose remaining charge SOC is low.

In this example, target output value for fuel cell 60 is set to a higher value the lower the remaining charge SOC of battery 50. By so doing, when the remaining charge SOC of battery 50 is low, it can be charged more rapidly so that the remaining charge SOC of battery 50 can be restored quickly.

When a target output value for fuel cell 60 is set, fuel cell 60 outputs power in response thereto (Step S130 in FIG. 5). Battery 50 then charges/discharges so as to compensate for the difference between the output of fuel cell 60 and the power demand corresponding to degree of acceleration (Step S140). These controls are performed according to a control signal for the power supply changeover switch 84 output by control unit 70. That is, where charging/discharging of battery 50 is required, connections among battery 50, motor 20 and fuel cell 60 are switched by changeover switch 84, and charging/discharging is performed in response to the voltage difference.

Output of power with fuel cell 60 in a power generation-enabled state was described above. In Step S110 of FIG. 5, if fuel cell 60 is in a power generation-disabled state, it is determined whether the remaining charge SOC of battery 50 is at or above a control lower limit LoS % (Step S150). If the remaining charge SOC of battery 50 is below control lower limit LoS %, engine 10 is started and drive power is output (Step S160). If the remaining charge SOC of battery 50 is at or above control lower limit LoS %, output is with the battery 50 as the principal power source (Step S170).

These processes are performed while progressively sampling degree of acceleration and remaining charge SOC of battery 50 at fixed intervals.

Figure 7:
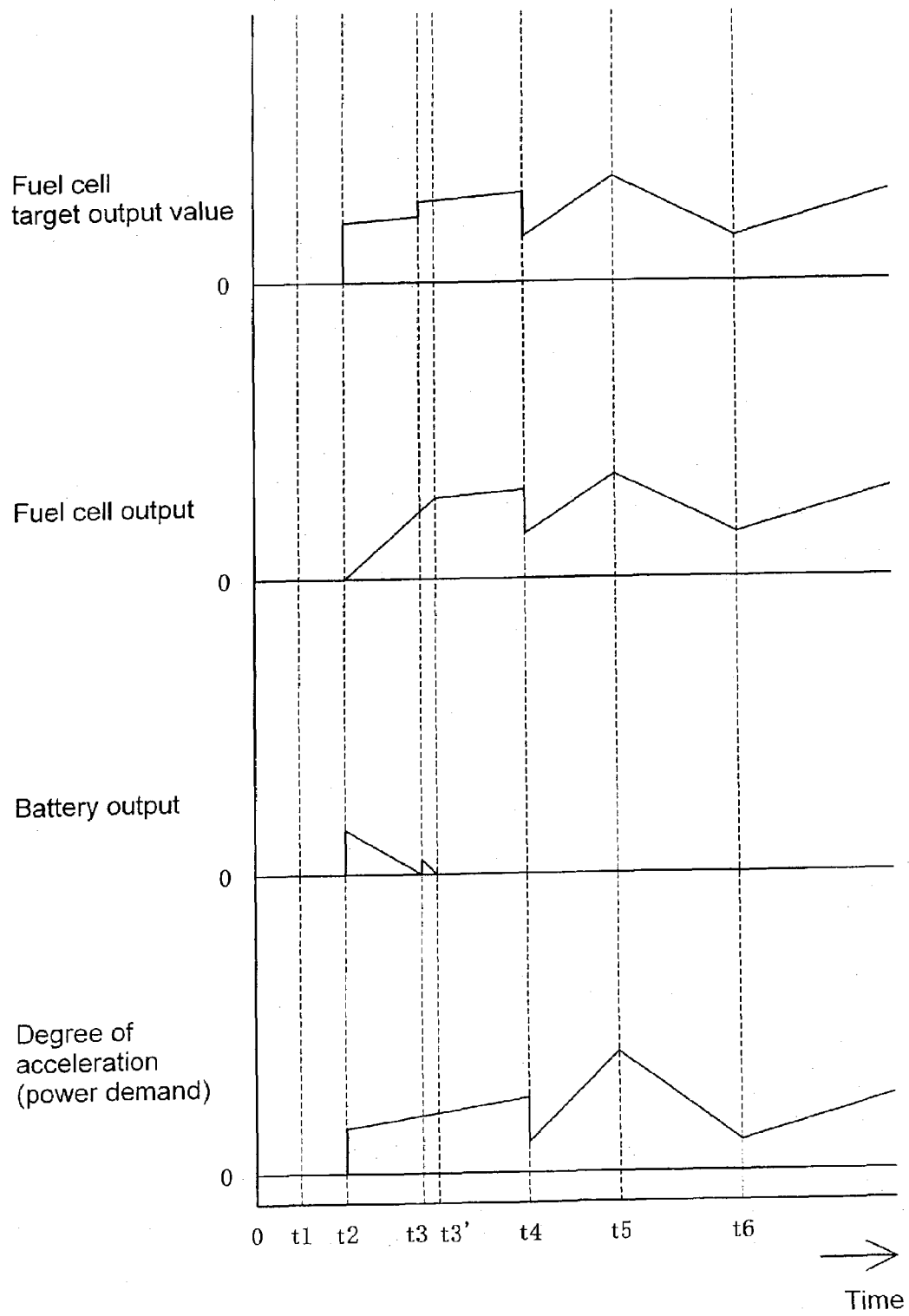
FIG. 7 is a timing chart showing change in fuel cell 60 target output value, actual output, and battery 50 output.

Next a specific example of control in Example 1 is given. FIG. 7 is a timing chart showing as one example change in fuel cell 60 target output value relative to degree of acceleration; actual output from fuel cell 60; and output from battery 50 in Example 1.

At time 0-t2 degree of acceleration is 0. During this period target output value for fuel cell 60, fuel cell 60 output and battery 50 output are also 0. When the ignition switch 88 is turned ON at time t1, while in actual practice warm-up of fuel cell 60 is required, fuel cell 60 and battery 50 assume output-enabled state.

At time t2 degree of acceleration increases sharply. Thereupon, the target output value for fuel cell 60 also increases sharply according to the table (see FIG. 6). As will be apparent from FIG. 6, target output value and power demand do not necessarily match. Target output value at time t2 is set to a larger value than power demand needed for driving. The output of fuel cell 60, due to low responsiveness, cannot track the sudden increase in target output value, and increases at maximum slope. At this time battery 50 outputs so as to compensate for the deficit in output of fuel cell 60. By so doing the remaining charge SOC of battery 50 drops.

At time t2-t4 degree of acceleration increases slowly. Thereupon, the target output value for fuel cell 60 also increases slowly according to the table. As will be apparent from FIG. 6, the rate of change in target output value for fuel cell 60 is lower than the rate of change of power demand associated with degree of acceleration. Control unit 70 at time t3 detects that the remaining charge SOC of battery 50 has dropped. Thereupon, target output value is increased to a level above normal target output value in response to this drop. Output of fuel cell 60 increases at maximum slope until reaching the target output value of fuel cell 60 at time t3'. At time t3'-t4', the rate of change of the target output value is smaller than the output responsiveness of fuel cell 60 and can be met by it, so the output of fuel cell 60 increases in association with the target output value. Battery 50 outputs so as to compensate for the deficit in output of fuel cell 60 until output of fuel cell 60 reaches target output value at time t3'. Subsequent to time t3' the output of fuel cell 60 exceeds power demand, so the excess power is used to charge the battery 50. Battery 50 at time t3'-t4 does not output, since the power demand can be output by output of the fuel cell 60 alone.

At time t4 degree of acceleration decreases sharply. Thereupon, the target output value for fuel cell 60 also decreases sharply according to the table. At time t4 control unit 70 detects that the remaining charge SOC of battery 50 has been sufficiently charged, and returns to the normal target output value. Output of fuel cell 60, the rate of change of the target output value being smaller than the output responsiveness of the fuel cell so that it can be met, declines in association with the target output value. Battery 50 does not output, since the power demand associated with the degree of acceleration can be output by output of the fuel cell 60 alone.

Assume that subsequent to time t4, degree of acceleration increases at time t4-t5, decreases at time t5-t6, and increases subsequent to time t6. During this period the target output value for fuel cell 60 increases/decreases at a rate of change smaller than the rate of change in degree of acceleration according to the table, and the output of fuel cell 60 increases/decreases to track the target output value. Battery 50 does not output, since the power demand associated with the degree of acceleration can be output by output of the fuel cell 60 alone.

Figure 8:
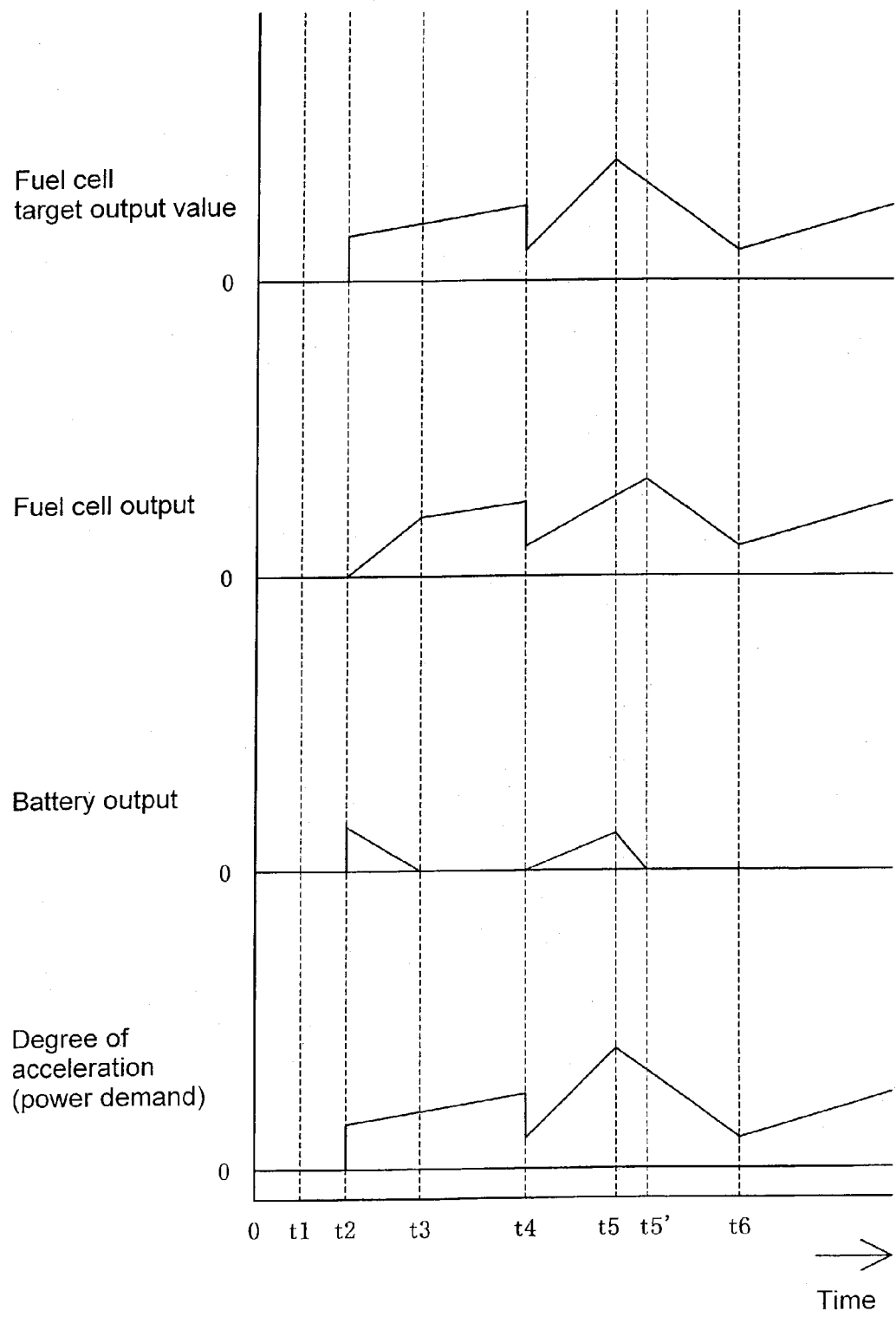
FIG. 8 is a timing chart showing change in fuel cell 60 target output value, actual output, and battery 50 output as a comparative example.

To elucidate further the advantages of control of Example 1 described above, conventional control of fuel cell 60 and battery 50 is described by way of comparative example. FIG. 8 is a timing chart showing as one example change in fuel cell 60 target output value relative to degree of acceleration; actual output from fuel cell 50; and output from battery 50 in a comparative example. Target output value of the fuel cell 60 of the comparative example is set to equal power demand associated with degree of acceleration.

At time 0-t2 degree of acceleration is 0. During this period target output value for fuel cell 60, fuel cell 60 output and battery 50 output are also 0.

At time t2 degree of acceleration increases sharply. Thereupon, the target output value for fuel cell 60 also increases sharply in association with degree of acceleration. The output of fuel cell 60, due to low responsiveness, cannot track the sudden increase in target output value, and increases at maximum slope. At this time battery 50 outputs so as to compensate for the deficit in output of fuel cell 60. By so doing the remaining charge SOC of battery 50 drops.

At time t2-t4 degree of acceleration increases slowly. Thereupon, the target output value for fuel cell 60 also increases slowly in association with degree of acceleration. Output of fuel cell 60 increases at maximum slope until reaching the target output value of fuel cell 60 at time t3. Battery 50 outputs so as to compensate for the deficit in output of fuel cell 60 until output of fuel cell 60 reaches target output value at time t3. At time t3-t4, the rate of change of the target output value is smaller than the output responsiveness of fuel cell 60 and can be met by it, so the output of fuel cell 60 increases in association with the target output value. At time t3-t4 battery 50 does not output, since the power demand associated with the degree of acceleration can be output by output of the fuel cell 60 alone.

At time t4 degree of acceleration decreases sharply. Thereupon, the target output value for fuel cell 60 also decreases sharply in association with a decline in the degree of acceleration. At this time output of fuel cell 60 can met the target output value and declines in association with the target output value. Battery 50 does not output, since the power demand associated with the degree of acceleration can be output by output of the fuel cell 60 alone.

At time t4-t5 degree of acceleration increases. During this period the target output value for fuel cell 60 increases in association with degree of acceleration. Output of fuel cell 60 cannot track the target output value since the rate of change of the target output value for fuel cell 60 is greater than in Example 1, and increases along the maximum slope. Battery 50 outputs so as to compensate for the deficit in output of fuel cell 60. By so doing the remaining charge SOC of battery 50 drops.

At time t5-t6 degree of acceleration decreases. During this period the target output value for fuel cell 60 increases in association with degree of acceleration. Output of fuel cell 60 increases at maximum slope until reaching the target output value at time t5', and after reaching it declines in association with the target output value. Battery 50 outputs so as to compensate for the deficit in output of fuel cell 60 until the output of fuel cell 60 reaches the target output value at time t5', and after reaching it no longer outputs since the power demand associated with the degree of acceleration can be output by output of the fuel cell 60 alone.

Subsequent to time t6 the degree of acceleration increases. During this period the target output value for fuel cell 60 increases in association with the degree of acceleration. Since the rate of change of the target output value is smaller than the output responsiveness of the fuel cell, the output of fuel cell 60 increases/decreases to track the target output value. Battery 50 does not output, since the power demand associated with the degree of acceleration can be output by output of the fuel cell 60 alone.

In this way, in the comparative example as in Example 1, battery 50 outputs so as to compensate for a deficit in output by fuel cell 60, so that responsiveness is assured. However, as target output value for fuel cell 60 is set to equal the power demand, in the event of a large fluctuation in the degree of acceleration, the output of fuel cell 60 will not be able to track the target output value, resulting in instances in which stable control with reference to target output value is not possible. Further, remaining charge SOC cannot be assured, and in the event that remaining charge SOC goes below a predetermined value, it may be necessary in some instances to run the engine 10 for charging.

According to Example 1, on the other hand, even where there are large fluctuations in the degree of acceleration, fluctuation in target output value for fuel cell 60 is smaller than output responsiveness, enabling output of fuel cell 60 to be controlled in a stable manner. As a result, output responsiveness to degree of acceleration may be assured while effectively utilizing fuel cell 60 as the power supply source. Additionally, as target output value is set with reference to remaining charge SOC of battery 50, battery 50 may be charged quickly and effectively. As a result, capacity of battery 50 can be reduces and the power supply device can be made smaller and lighter.

(4) Example 2:

In Example 1, degree of acceleration and remaining charge SOC of battery 50 are sampled at fixed intervals, and target output value for fuel cell 60 established progressively with reference to these. In Example 2, the rate of change in degree of acceleration is calculated from the degree of acceleration sampled at fixed intervals, and the setting process of target output value for fuel cell 60 is modified with reference thereto. The flow of drive power process routines other than the setting process of target output value for fuel cell 60 is similar.

Figure 9:
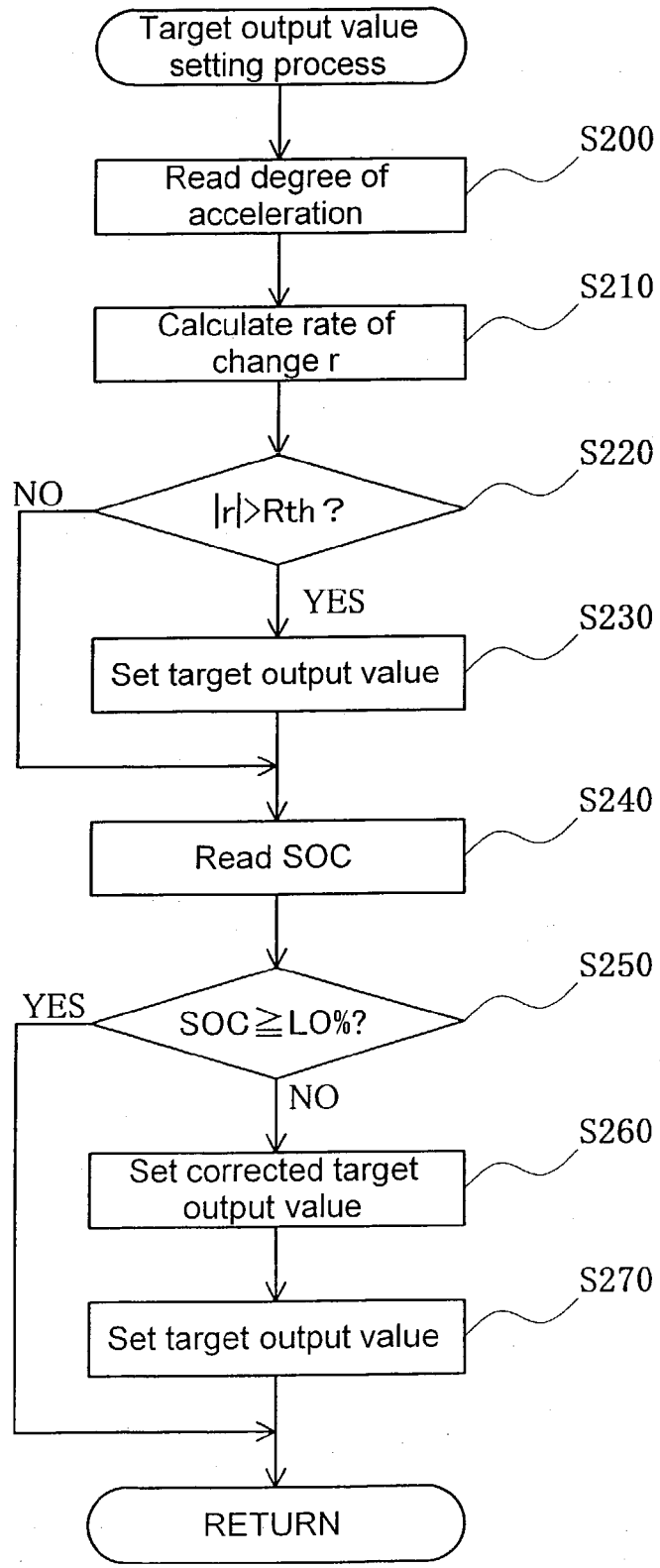
FIG. 9 is a flow chart of a target output value setting process routine in Example 2.

FIG. 9 is a flow chart of a setting process of target output value for fuel cell 60 in Example 2. When this process starts, CPU first reads the degree of acceleration (Step S200). A rate of change |r| of degree of acceleration is then calculated from the previously read degree of acceleration, currently read degree of acceleration, and sampling time (Step S210), and the absolute value of the rate of change |r| is compared with a rate of change threshold value Rth pre-stored in ROM (Step S220). If the absolute value of the rate of change |r| exceeds the threshold value Rth, setting of a new target output value with reference to the degree of acceleration is performed (Step S230). The target output value set here is the target output value when remaining charge SOC of battery 50 is in the normal state in Example 1 shown in FIG. 6. It should be noted that the table storing relationships of degree of acceleration and target output value for fuel cell 60 (see FIG. 6) can be set arbitrarily. If the absolute value of the rate of change |r| is equal to or less than the threshold value Rth, setting of a new target output value is not performed, and the previous target output value is held as-is. That is, control is performed so as to modify to a new target output value when the rate of change in degree of acceleration is large and to not modify progressive target output value when the rate of change is small.

Threshold value Rth can be set arbitrarily. For example, threshold value Rth may be fixed. Alternatively, it may be progressively modified through decisions made on the basis of the trend of driver operation of the accelerator pedal 55, or past fuel cell 60 and battery operating conditions. Threshold value Rth may assume different values when the rate of change in degree of acceleration is positive versus when it is negative.

Next, the remaining charge SOC of battery 50 is read (Step S240), and it is determined whether the remaining charge SOC of battery 50 is at or above a predetermined value LO % (Step S250). If the remaining charge SOC of battery 50 is at or above predetermined value LO %, it is decided that the remaining charge SOC of battery 50 is adequate, and this process is terminated. If the remaining charge SOC of battery 50 is below predetermined value LO %, a correction value for increasing the target output value is set so that battery 50 can be charged with output from fuel cell 60 (Step S260). This is added to arrive at a new target output value (Step S270).

Predetermined value LO can be set arbitrarily. However, if LO is set too high, correction of target output value in Steps S260, S270 will be performed frequently, in some instances making stable operation of fuel cell 60 impossible. On the other hand if LO is set too low, battery 50 will be used frequently and in some instances fuel cell 60 cannot be utilized efficiently.

Figure 10:
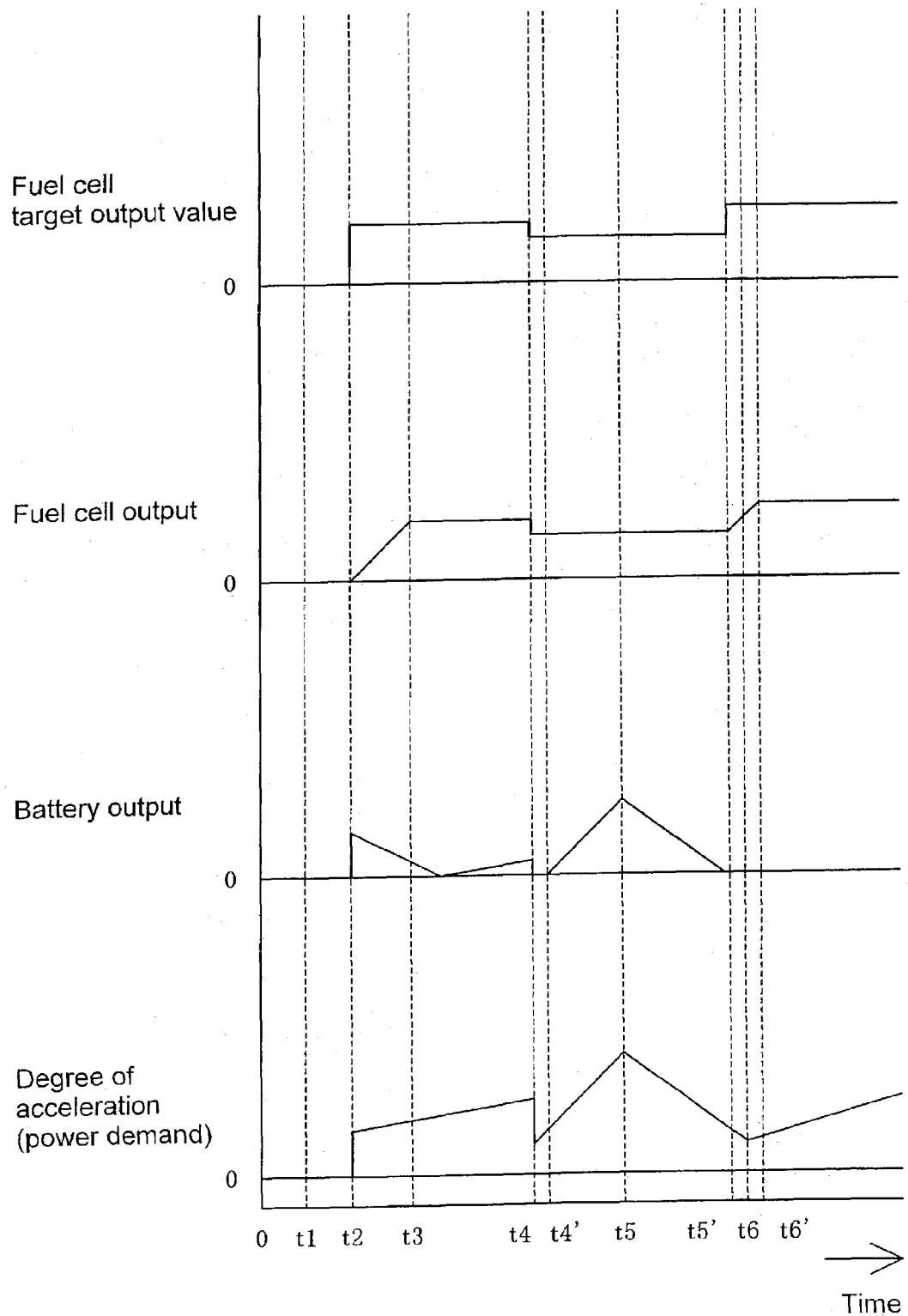
FIG. 10 is a timing chart showing change in fuel cell 60 target output value, actual output, and battery 50 output.

Next a specific example of control in Example 2 is given. FIG. 10 is a timing chart showing as one example change in fuel cell 60 target output value relative to degree of acceleration; actual output from fuel cell 60; and output from battery 50 in Example 2.

At time 0-t2 degree of acceleration is 0. During this period target output value for fuel cell 60, fuel cell 60 output and battery 50 output are also 0.

At time t2 degree of acceleration increases sharply. At this time the absolute value of the rate of change in degree of acceleration exceeds threshold value Rth. Thereupon, the target output value for fuel cell 60 also increases sharply in association with the degree of acceleration. The output of fuel cell 60, due to low responsiveness, cannot track the sudden increase in target output value, and increases at maximum slope. At this time battery 50 outputs so as to compensate for the deficit in output of fuel cell 60.

At time t2-t4 degree of acceleration increases slowly. At this time the absolute value of the rate of change in degree of acceleration is at or below threshold value Rth. The target output value for fuel cell 60 is held at the value set at time t2. The output of fuel cell 60 increases at maximum slope until reaching the target output value at time t3. At time t3-t4, constant power is output with reference to the target output value. Battery 50 outputs so as to compensate for the deficit in output of fuel cell 60.

At time t4 the degree of acceleration decreases sharply. At this time, the absolute value of the rate of change in degree of acceleration exceeds threshold value Rth. Thereupon, the target output value for fuel cell 60 also decreases sharply in association with the degree of acceleration. The output of fuel cell 60 declines to track the target output value. Battery 50 does not output, since the power demand associated with the degree of acceleration can be output by output of the fuel cell 60 alone.

At time t4-t5 degree of acceleration increases. At this time the absolute value of the rate of change in degree of acceleration is at or below threshold value Rth. Thereupon target output value for fuel cell 60 is held at the value set at time t42. Fuel cell 60 outputs constant power with reference to the target output value. Battery 50 outputs so as to compensate for the deficit in output of fuel cell 60.

At time t5-t6 the degree of acceleration decreases. At this time the absolute value of the rate of change in degree of acceleration is at or below threshold value Rth. Thereupon the target output value for fuel cell 60 is held at the value of time t4 (or t5) until time t5' at which control unit 70 senses that the remaining charge SOC of battery 50 is below LO%. Fuel cell 60 outputs with reference to target output value until time t5'. Battery 50 outputs so as to compensate for the deficit in output of fuel cell 60.

At time t5' control unit 70 senses that the remaining charge SOC of battery 50 is below LO %. Thereupon, while degree of acceleration is decreased at this time, the target output value for fuel cell 60 is corrected to high so that battery 50 can be charged rapidly. The output of fuel cell 60, due to low responsiveness, cannot track this increase in target output value, and increases at maximum slope.

At time t6 and subsequently degree of acceleration increases slowly. At this time the absolute value of the rate of change in degree of acceleration is at or below threshold value Rth. Thereupon target output value for fuel cell 60 is held at the value set at time t5'. Fuel cell 60 outputs constant power is output with reference to the target output value. Battery 50 does not output, since the power demand associated with the degree of acceleration can be output by output of the fuel cell 60 alone.

Output of fuel cell 60 at time t5' and subsequently shown in the drawing is greater than the power demand, so the excess power is used to perform charging of battery 50. While not shown in the drawing, also where the degree of acceleration declines slowly after increasing sharply, i.e., where the absolute value of the rate of change in degree of acceleration is at or below threshold value Rth, the target output value for fuel cell 60 does not decline, so charging of the battery 50 can be performed.

In Example 2, as regards the fuel cell 60 having low output responsiveness relative to degree of acceleration, control for stable operation of fuel cell 60 is performed by making it less sensitive to degree of acceleration. The battery 50, which has good output responsiveness, is used for sudden changes in degree of acceleration. In this way as well, output responsiveness relative to degree of acceleration can be ensured, excessive charge/discharge of the storage portion can be minimized, and fuel cell 60 can be utilized effectively as a power supply source.

(5) Example 3

Figure 11:
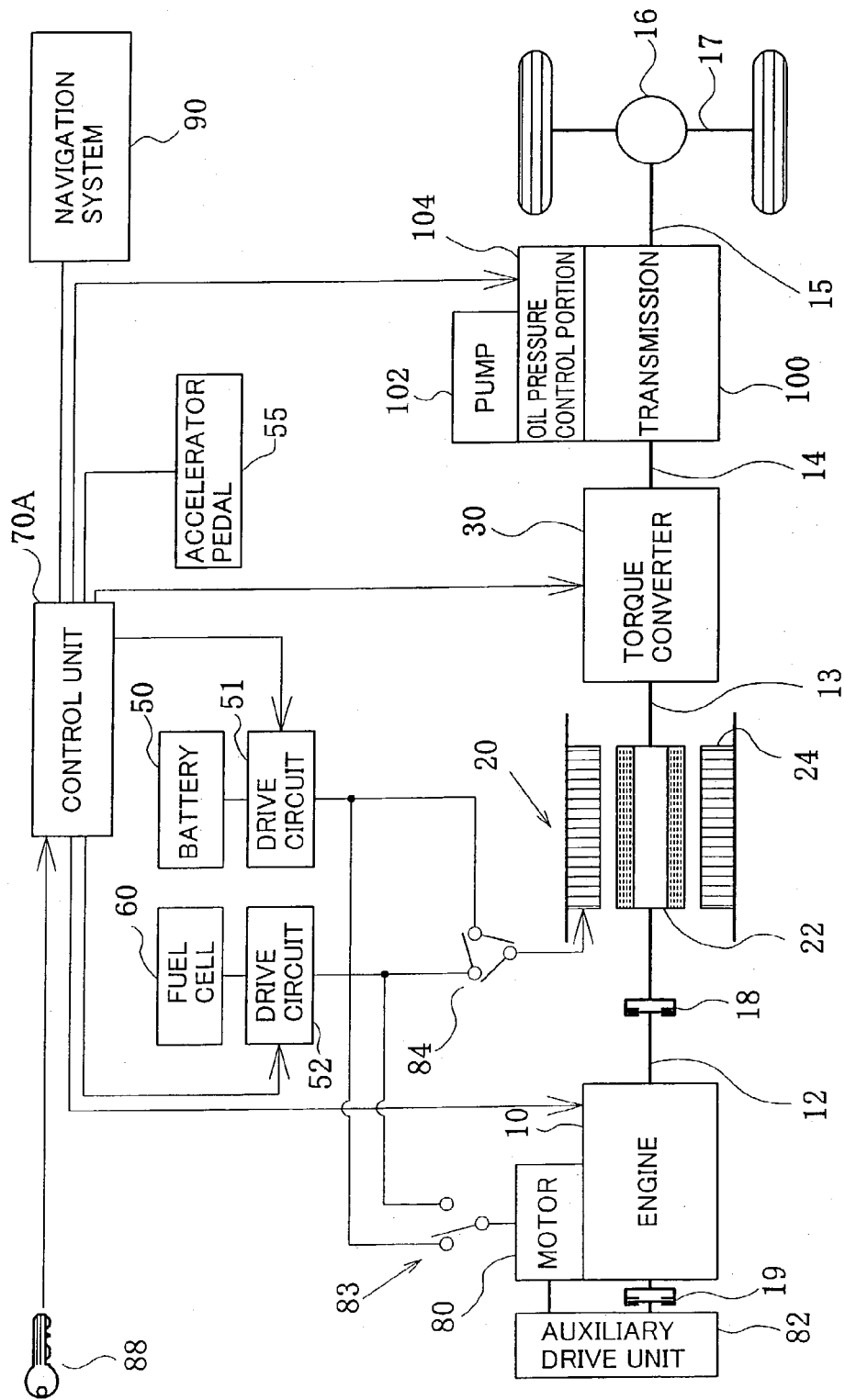
FIG. 11 is a simplified configuration diagram of the hybrid vehicle of Example 3.

The hybrid vehicle of Example 3 is equipped with a navigation system. FIG. 11 is a simplified configuration diagram of the hybrid vehicle of Example 3. Navigation system 90 is connected to a control unit 70B, and to control unit 70B is input information about the route over which the vehicle will travel in the future. The arrangement of other hardware is similar to Example 1. Between Example 1 and Example 3, the power output process differs in part.

Figure 12:
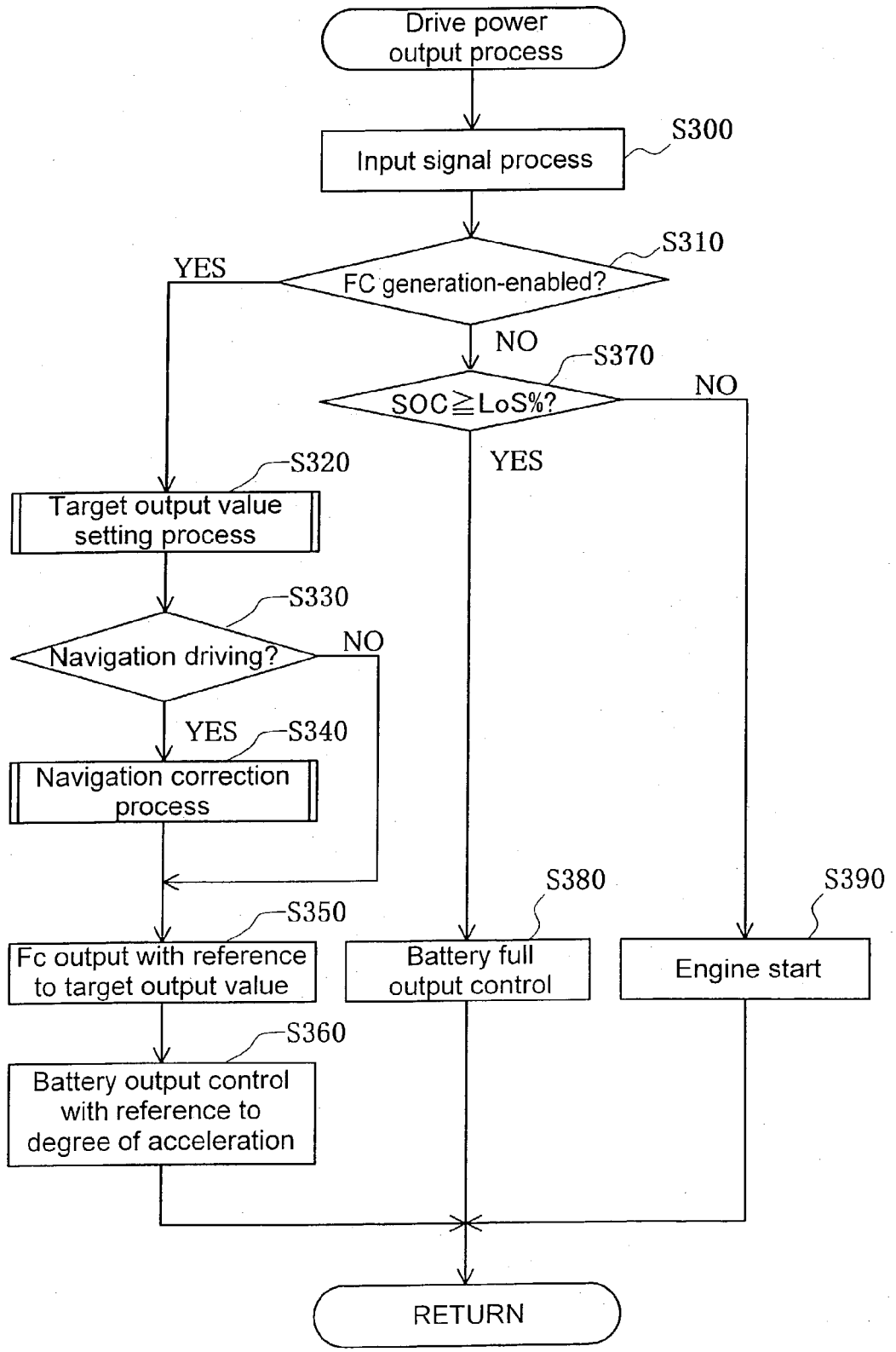
FIG. 12 is a flow chart of a power output process routine in Example 3.

FIG. 12 is a flow chart of a power output process routine in Example 3. When this process is started, the CPU inputs various sensor and switch signals (Step S300). Next, the CPU determines whether fuel cell 60 is in a power generation-enabled state (Step S310).

If fuel cell 60 is in a power generation-enabled state, a setting process of a target output value for output by fuel cell 60 is performed (Step S320). This process is the same as in Example 1. Once a target output value for fuel cell 60 has been set, a decision as to whether or not the navigation system 90 is being used in driving (Step S330) is made. If not driving using the navigation system 90, fuel cell 60 outputs power with reference to target output value just as in Example 1 (Step S350), and battery 50 charges/discharges so as to compensate for the difference between the output of fuel cell 60 and the power demand corresponding to degree of acceleration (Step S360). Where driving using the navigation system 90, a correction process for navigation system driving use is performed on target output value.

In the event of traffic congestion or in the event of being stopped at light, etc., the determination may be made in Step S330 that driving is not using the navigation system.

Figure 13:
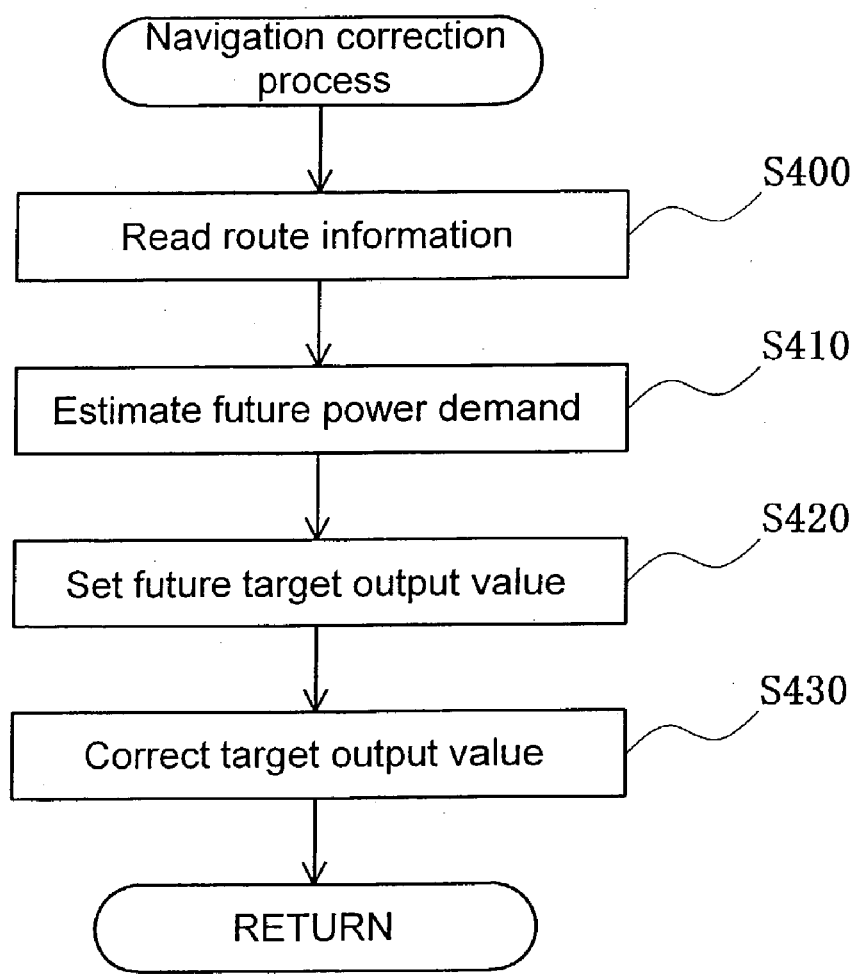
FIG. 13 is a flow chart of a target output value correction process.

FIG. 13 is a flow chart of a target output value correction process for navigation system driving use. When this process is started, the CPU reads route information from navigation system 90 (Step S400). This route information includes information relating to upgrade or downgrade slope, or information for a freeway etc. Power demand at a predetermined time in the future is then estimated based on this route information (Step S410). For example, if CPU should detect from navigation system 90 that there is a future upgrade, the power needed to climb the upgrade will be estimated. Target output value at a predetermined time in the future is then set based on the estimated future power demand (Step S420). Next, target output value is corrected using this future target output value, the target output value set in Step 320 of FIG. 12, target output value at predetermined time in the future, and output characteristics of fuel cell 60 (maximum slope outputtable) (Step S430).

Figure 14:
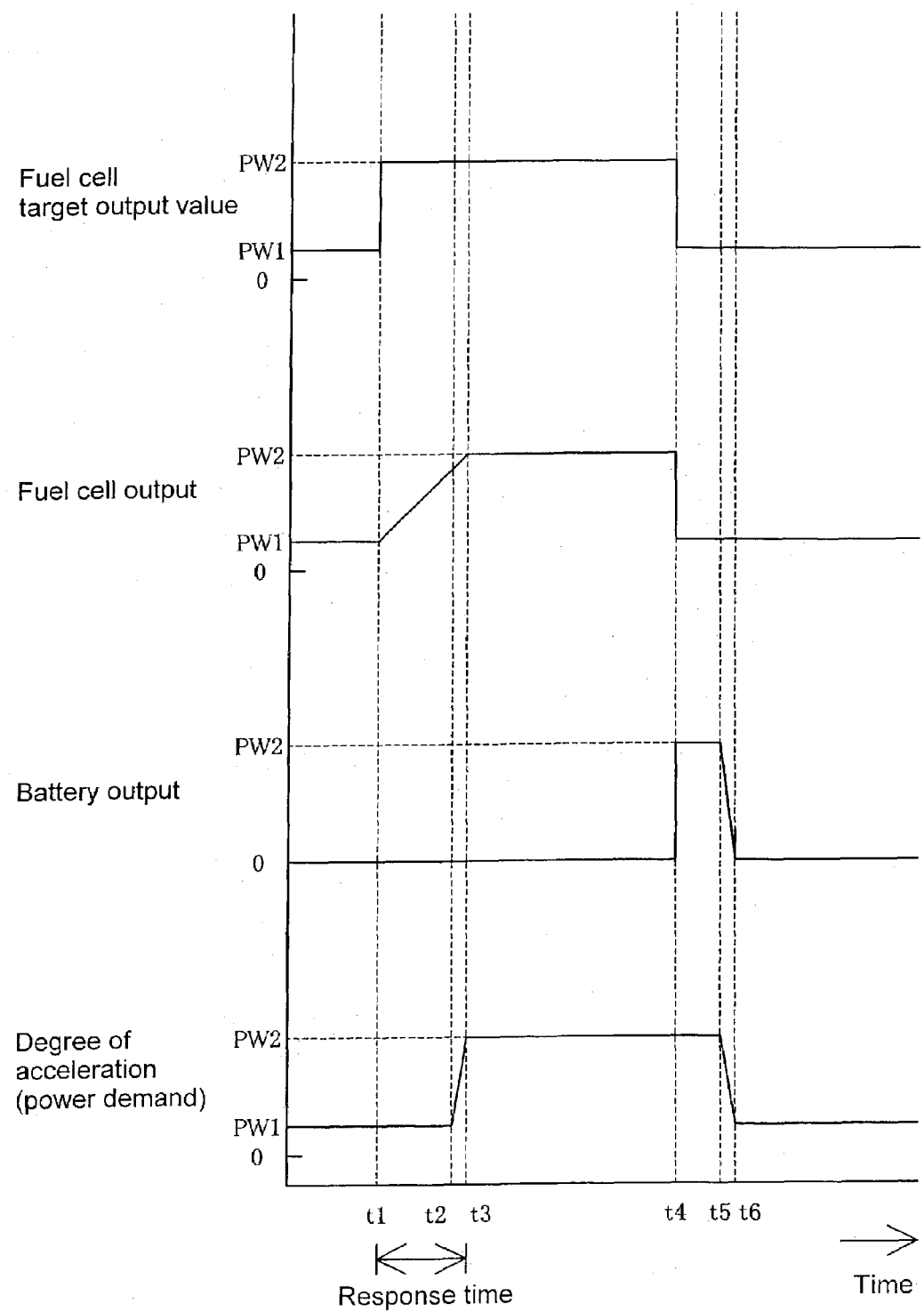
FIG. 14 is a timing chart showing change in fuel cell 60 target output value, actual output, and battery 50 output.

FIG. 14 is a timing chart showing as an example change in fuel cell 60 target output value associated with degree of acceleration, actual output of fuel cell 60, and battery 50 output. Degree of acceleration is constant up to time t2 and requires power PW1. At time t2-t3 there is an upgrade, increasing to PW2 and then remaining constant at time t3-t5. At time t5-t6 there is a downgrade, decreasing to PW1. At time t6 and thereafter it is constant.

On the basis of route information from navigation system 90 control unit 70 can recognize, prior to time t5 nearing the downgrade, that there is a future downgrade. From current target output value PW2, future target output value PW1 and output characteristics of fuel cell 60, it is recognized that even if target output value at time t4 is reduced to PW2 and battery 50 power is consumed, [the battery] can be recharged on the downgrade, and it corrects the target output value [accordingly]. At time t4-t6 fuel cell 60 output in insufficient for power demand, the deficit being made up for by output from the battery 50.

In the preceding description, there was described implementing increase and decrease in fuel cell 60 output in the case of an upgrade and downgrade, but an increase in output could be implemented, for example, in the case of accelerating to enter a freeway, etc.

Hereinabove was described output of drive power when fuel cell 60 is in a generation-enabled state. In Step S310 of FIG. 12, if fuel cell 60 is in a generation-disabled state, it is determined whether the remaining charge SOC of battery 50 is at or above the control lower limit LoS % (Step S370). If the remaining charge SOC of battery 50 is below the control lower limit LoS %, the engine 10 is started and drive power is output (Step S380). If the remaining charge SOC of battery 50 is at or above the control lower limit LoS %, battery 50 outputs as the main power source (Step S390).

According to Example 3, in a vehicle having an on-board navigation system 90, fuel cell 60 can be utilized effectively as a power supply source while ensuring output responsiveness to the degree of acceleration.

(6) Alternative Examples:

While the invention was described hereinabove through several embodiments, the invention is in no way limited to these embodiments, and may be reduced to practice in various modes without departing from the scope thereof. For example, the following alternative examples are possible.

In Example 1 hereinabove, relationships of battery 50 remaining charge SOC, degree of acceleration, and target output value for fuel cell 60 are stored as a table, but instead target output value for fuel cell 60 could be calculated using battery 50 remaining charge SOC and degree of acceleration as parameters.

In Example 2 hereinabove, it is decided from the rate of change of degree of acceleration whether or not to perform correction of the target output value for fuel cell 60, but instead correction of the target output value for fuel cell 60 could be performed based on the rate of change of degree of acceleration and the amount of change in degree of acceleration. By so doing, in the case that the degree of acceleration changes by more than a certain value while the rate of change in degree of acceleration is still small, excessive charge/discharge of battery 70 can be minimized, and suitable target output value set.

Also, in Example 2 hereinabove the rate of change in degree of acceleration is calculated from degree of acceleration sampled at fixed intervals, but rate of change in degree of acceleration could instead be sensed directly using a sensor.

Figure 15:
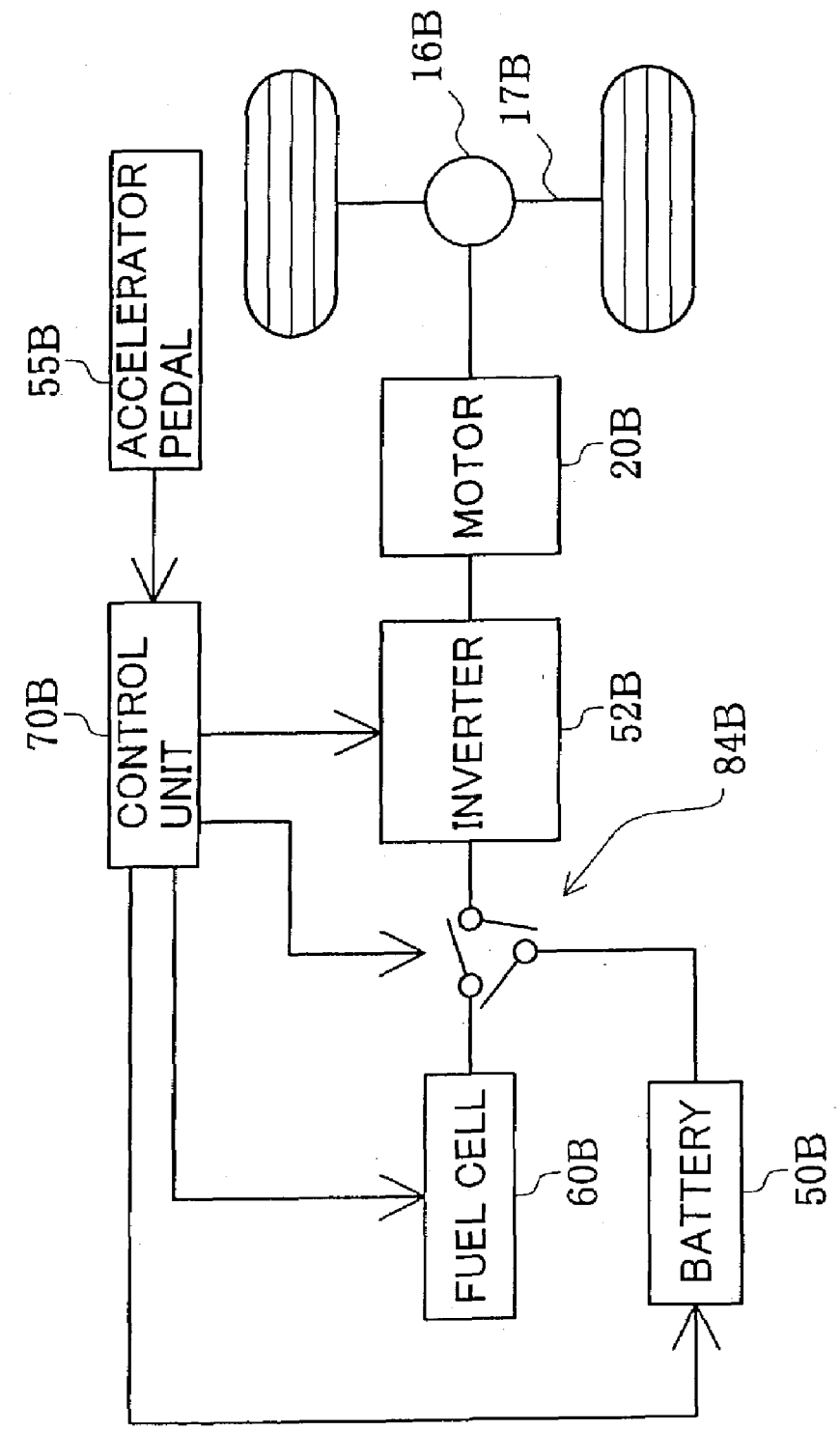
FIG. 15 is a simplified configuration diagram of an electric vehicle.

In the examples hereinabove, there was described implementation of the invention in a hybrid vehicle, but implementation is an electric vehicle lacking an engine is also possible. FIG. 15 is a simplified configuration diagram of an electric vehicle. This electric vehicle comprises a fuel cell 60B, battery 50B, control unit 70B, changeover switch 84B, inverter 52B, motor 20B, accelerator pedal 55B, differential gear 16B, axle 17B etc. In FIG. 15, auxiliary drive motor 82, transmission 100 etc. shown in FIG. 1 are omitted.

In the examples hereinabove, a battery 50 is used as the rechargeable storage portion, but a capacitor or other such storage means could be used instead.

In the examples hereinabove, there was described a hybrid vehicle wherein drive power from engine 10 can be transmitted to axle 17, i.e. a parallel hybrid vehicle, but could instead be implemented in a series hybrid vehicle.

In the examples hereinabove, various control processes are performed by the CPU executing software, but these control processes could instead be realized through hardware.

INDUSTRIAL APPLICABILITY

The invention can be utilized to control a power supply device having a fuel cell and storage portion as the power source.

The invention claimed is:

1. Power supply device that supplies power using a fuel cell and rechargeable storage portion as the power source, said power supply device comprising:
   a portion for sensing a power demand;
   a fuel cell control portion for controlling operation of said fuel cell with reference to a predetermined target output value determined with reference to said power demand;
   a comparison portion for comparing a rate of change of said power demand to a predetermined value;
   a charge/discharge portion for charging/discharging said storage portion to compensate for difference between said power demand and power outputtable by said fuel cell; and
   a target output value setting portion for modifying said target output value of said fuel cell with reference to said power demand when the absolute value of the rate of change of said power demand exceeds the predetermined value.

2. Power supply device according to claim 1 further comprising
   a sensor portion for sensing a remaining charge of said storage portion; and
   a target output value correcting portion for correcting said target output value with reference to said remaining charge.

3. Power supply device according to claim 1 wherein the predetermined value indicates a sudden change in power demand.

4. Power supply device that supplies power using a fuel cell and rechargeable storage portion as the power source, said power supply device comprising:
   means for sensing a power demand;
   fuel cell control means for controlling operation of said fuel cell with reference to a predetermined target output value determined with reference to said power demand;
   comparison means for comparing a rate of change of said power demand to a predetermined value;
   charge/discharge means for charging/discharging said storage portion to compensate for a difference between said power demand and power outputtable by said fuel cell;
   target output value setting means for modifying said target output value of said fuel cell with reference to said power demand when said means for sensing a power demand senses that the absolute value of the rate of change of said power demand exceeds the predetermined value.

5. Power supply device according to claim 4 further comprising
   means for sensing a remaining charge of said storage portion; and
   target output value correcting means for correcting said target output value with reference to said remaining charge.

6. Power supply device according to claim 4 wherein the predetermined value indicates a sudden change in power demand.

* * * * *